United States Patent
Masy et al.

(10) Patent No.: US 10,767,009 B2
(45) Date of Patent: Sep. 8, 2020

(54) PROCESS FOR PREPARING POLYETHER POLYOL USING DMC CATALYST AND CONTINUOUS ADDITION OF STARTER

(71) Applicant: Covestro LLC, Pittsburgh, PA (US)

(72) Inventors: Jean-Paul Masy, Terneuzen (NL); Carlos M. Villa, Freeport, TX (US); David A. Babb, Freeport, TX (US); John W. Weston, Freeport, TX (US); Sweta Somasi, Indianapolis, IN (US)

(73) Assignee: Covestro LLC, Pittsburgh, PA (US)

( * ) Notice: Subject to any disclaimer, the term of this patent is extended or adjusted under 35 U.S.C. 154(b) by 64 days.

(21) Appl. No.: 15/737,813

(22) PCT Filed: Jun. 20, 2016

(86) PCT No.: PCT/US2016/038426
§ 371 (c)(1),
(2) Date: Dec. 19, 2017

(87) PCT Pub. No.: WO2017/003748
PCT Pub. Date: Jan. 5, 2017

(65) Prior Publication Data
US 2018/0237587 A1  Aug. 23, 2018

Related U.S. Application Data

(60) Provisional application No. 62/188,406, filed on Jul. 2, 2015.

(51) Int. Cl.
*C08G 18/48* (2006.01)
*C08G 65/26* (2006.01)
*C08G 101/00* (2006.01)

(52) U.S. Cl.
CPC ..... *C08G 65/2663* (2013.01); *C08G 18/4829* (2013.01); *C08G 65/2696* (2013.01); *C08G 2101/0025* (2013.01)

(58) Field of Classification Search
CPC ............... C08G 18/48; C08G 18/4829; C08G 65/2663; C08G 65/2696; C08G 65/34; C08G 2101/0025; C08J 9/141
See application file for complete search history.

(56) References Cited

U.S. PATENT DOCUMENTS

| | | |
|---|---|---|
| 3,278,457 A | 10/1966 | Milgrom |
| 3,278,458 A | 10/1966 | Belner |
| 3,278,459 A | 10/1966 | Herold |
| 3,404,109 A | 10/1968 | Milgrom |
| 3,427,256 A | 2/1969 | Milgrom |
| 3,427,334 A | 2/1969 | Belner |
| 3,427,335 A | 2/1969 | Herold |
| 5,470,813 A | 11/1995 | Le-Khac |
| 5,689,012 A | 11/1997 | Pazos et al. |
| 5,777,177 A | 7/1998 | Pazos |
| 6,077,978 A | 6/2000 | McDaniel et al. |
| 6,491,846 B1 | 12/2002 | Reese, II et al. |
| 6,835,801 B2 | 12/2004 | Hayes |
| 7,919,575 B2 | 4/2011 | Browne |
| 9,035,105 B2 | 5/2015 | Reese et al. |
| 9,051,412 B2 | 6/2015 | Reese et al. |
| 9,879,114 B2 | 1/2018 | Reese et al. |
| 2010/0125126 A1 | 5/2010 | Lorenz et al. |
| 2010/0324340 A1 | 12/2010 | Pazos et al. |
| 2011/0230581 A1 | 9/2011 | Klescewski et al. |
| 2012/0016048 A1* | 1/2012 | Hager ............... C08G 18/4812 521/137 |
| 2013/0345476 A1* | 12/2013 | Reese ..................... C07C 41/03 568/620 |
| 2014/0275633 A1* | 9/2014 | Reese ..................... C07C 41/03 568/620 |

* cited by examiner

*Primary Examiner* — John M Cooney
(74) *Attorney, Agent, or Firm* — N. Denise Brown

(57) ABSTRACT

Polyether polyols are made by a process that includes a continuous addition of starter and alkylene oxide. The feed of starter is discontinued when 80 to 95% of the alkylene oxide has been fed to the reactor. This process produces a product with a narrow molecular weight distribution.

14 Claims, 1 Drawing Sheet

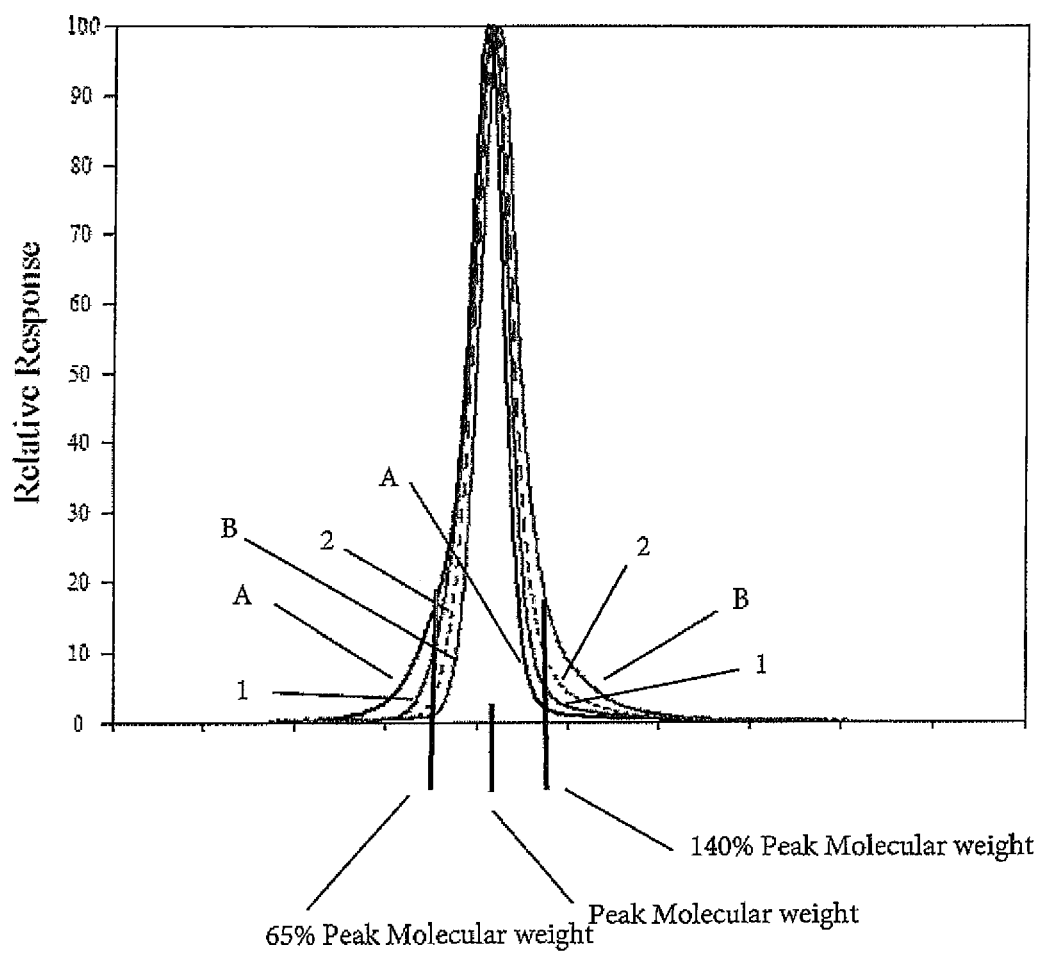

PROCESS FOR PREPARING POLYETHER POLYOL USING DMC CATALYST AND CONTINUOUS ADDITION OF STARTER

CROSS-REFERENCE TO RELATED APPLICATIONS

This Application is a National Phase Application of PCT/US2016/038426, filed Jun. 20, 2016, which claims priority to U.S. Provisional Application Ser. No. 62/188,406, filed Jul. 2, 2015, each of which being incorporated herein by reference.

FIELD

This invention relates to a process for making polyether polyols using a double metal cyanide catalyst complex.

BACKGROUND

Double metal cyanide (DMC) catalyst complexes are known to be useful catalysts for polymerizing 1,2-propylene oxide. DMC catalyst complexes have certain advantages over the more traditional potassium hydroxide catalysts. DMC catalyst complexes in most cases do not need to be removed from the polymerized product. This represents a very significant savings in manufacturing costs. In addition, DMC catalyst complexes produce a product that has a low level of monofunctional impurities.

A disadvantage of DMC catalyst complexes is they tend to produce a quantity of undesirably high molecular weight material, which often consists of two distinct fractions. One fraction has molecular weights from about 20% greater than the peak molecular weight (as determined by gel permeation chromatography), up to about 30,000; this fraction may constitute 1% to 15% or more of the mass of the polymer. The other fraction is very high molecular weight material (50,000 or more and often 100,000 or more g/mol) that is present in very small amounts but is nonetheless very significant. This very high molecular weight fraction is a potent surfactant, and is known to interfere with the production of polyurethane foam from the polyether polyol product.

One way to reduce amount of high molecular weight material is by performing the polymerization in a semi-batch method, in which a starter compound and propylene oxide are continuously added to a reactor that contains the activated catalyst. Such a method is described in U.S. Pat. Nos. 5,777,177 and 6,077,978. Unfortunately, this approach leads to the opposite problem, that is, the creation of a significant fraction of low molecular weight material. This low molecular weight material may constitute 5 to 15% or more of the total mass of the product. The low molecular weight material includes polyethers that have molecular weights 65% or less of the peak molecular weight of the material.

The low molecular weight material causes significant difficulties in some applications. One such application is the production of polyurethane foams using as the blowing agent a mixture of water and certain physical blowing agents such as cyclopentane. It is difficult to form a homogeneous mixture of the polyol, water and physical blowing agent, in part at least because the low molecular weight material tends to coalesce with the water and form a separate phase. This problem is not seen when the polyether polyol is made using potassium hydroxide catalysts. In that case, the polyether polyol, water and physical blowing agents form a homogeneous mixture, and so these components can be mixed to form a formulated "B-side" composition that can be stored and transported. Because of the compatibility problem, corresponding mixtures in which the polyether polyol is a DMC-based polyol tend to phase-separate.

SUMMARY

A method for making a polyether polyol that has a highly controlled molecular weight and in particular at most only a small amount of both the high molecular weight material and the low molecular weight material is desired.

This invention is in one aspect a process for making a polyether polyol product, comprising:
a) activating a DMC catalyst complex in the presence of
   i) an alkoxylated starter having a hydroxyl equivalent weight of 50 to 100% of the hydroxyl equivalent weight of the polyether polyol product and ii) up to 10 weight-%, based on the weight of the alkoxylated starter, of 1,2-propylene oxide;
b) continuously feeding an alkylene oxide containing at least 50 weight-% 1,2-propylene oxide to the activated DMC catalyst under polymerization conditions,
wherein starting at the beginning of step b), a low equivalent weight starter is fed continuously to the activated DMC catalyst under polymerization conditions, the feed of low molecular weight starter is continued until 80 to 95% of the alkylene oxide feed in step b) has been completed and the feed of low molecular weight starter is then discontinued while continuing the alkylene oxide feed, wherein the total weight of low molecular weight starter added in step b) is 0.2 to 25% of the total weight of alkylene oxide added in step b).

This process produces a polyether polyol having an especially narrow molecular weight range, with at most only a small amount of high molecular weight material and a small amount of low molecular weight material. Surprisingly, the polyether polyol exhibits good compatibility with physical blowing agents, particularly hydrocarbon blowing agents such as cyclopentane, and with water, and can compatibilize water and those blowing agents effectively. Thus, formulated systems containing the polyol, the physical blowing agent and water tend to resist phase separation and exhibit little if any coalescence of the water. In this regard, the polyether polyol made in the process of this invention performs very similarly to those made using potassium hydroxide as the polymerization catalyst.

The invention is also a polyether polyol made in the process of the invention.

In addition, the invention is also a formulated polyol composition that includes a polyether polyol made in the process of the invention, water and 5 to 40% by weight, based on the weight of the formulated polyol composition, of at least one physical blowing agent. The invention is in yet another aspect a polyurethane foam made by combining the formulated polyol composition with at least one polyisocyanate and curing the resulting composition to produce a polyurethane foam.

BRIEF DESCRIPTION OF DRAWING

The FIGURE is superimposed gel permeation chromatography graphs for two polyols made in accordance with the invention, and two comparative polyols.

DETAILED DESCRIPTION

Suitable double metal cyanide catalyst complexes include those described, for example, in U.S. Pat. Nos. 3,278,457, 3,278,458, 3,278,459, 3,404,109, 3,427,256, 3,427,334, 3,427,335 and 5,470,813. Some suitable DMC catalysts can be represented by the formula

$$M_b[M^1(CN)_r(X)_t]_c[M^2(X)_6]_d \cdot nM^3_xA_y$$

wherein M and $M^3$ are each metals; $M^1$ is a transition metal different from M, each X represents a group other than cyanide that coordinates with the $M^1$ ion; $M^2$ is a transition metal; A represents an anion; b, c and d are numbers that reflect an electrostatically neutral complex; r is from 4 to 6; t is from 0 to 2; x and y are integers that balance the charges in the metal salt $M^3_xA_y$, and n is zero or a positive integer. The foregoing formula does not reflect the presence of neutral complexing agents such as t-butanol which are often present in the DMC catalyst complex.

M and $M^3$ each are preferably a metal ion independently selected from the group consisting of $Zn^{2+}$, $Fe^{2+}$, $Co^{+2+}$, $Ni^{2+}$, $Mo^{4+}$, $Mo^{6+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$ and $Cr^{3+}$, with $Zn^{2+}$ being preferred.

$M^1$ and $M^2$ are preferably $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh^{3+}$, $Ru^{2+}$, $V^{4+}$, $V^{5+}$, $Ni^{2+}$, $Pd^{2+}$, and $Pt^{2+}$. Among the foregoing, those in the plus-three oxidation state are more preferred as the $M^1$ and $M^2$ metal. $Co^{+3}$ and $Fe^{+3}$ are even more preferred and $Co^{+3}$ is most preferred.

Suitable anions A include but are not limited to halides such as chloride, bromide and iodide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate) and a $C_{1-4}$ carboxylate. Chloride ion is especially preferred.

r is preferably 4, 5 or 6, preferably 4 or 6, and most preferably 6; t is preferably 0 or 1, most preferably 0. In most cases, r+t will equal six.

A suitable type of DMC catalyst is a zinc hexacyanocobaltate catalyst complex as described, for example, in any of U.S. Pat. Nos. 3,278,457, 3,278,458, 3,278,459, 3,404,109, 3,427,256, 3,427,334, 3,427,335 and 5,470,813. An especially preferred type of DMC catalyst is complexed with t-butanol.

The amount of DMC catalyst complex is generally expressed in terms of parts by weight of metals in the catalyst per million parts by weight of the product. A suitable amount is, for example, 5 to 500 parts per million, especially 5 to 200 parts per million, 5 to 100 parts per million or 5 to 50 parts per million of product.

Only a portion of the DMC catalyst complex needs to be present in the activation step. For example, 5 to 50% by weight of the total amount of DMC catalyst can be present in the activation step. In such cases, the remaining DMC catalyst is fed during all or a portion of the alkylene oxide feed in step b) of the process.

If desired, the DMC-catalyzed polymerization can be performed in the presence of a MG3-15LA compound as described in WO 2012/091968.

In the process of the invention, the DMC catalyst complex is activated in the presence of i) an alkoxylated starter having a molecular weight of 50 to 100% of the molecular weight of the polyether polyol product and ii) up to 10 weight-%, based on the weight of the alkoxylated starter, of 1,2-propylene oxide. A preferred amount is 0.5 to 10 weight-%, a more preferred amount is 2 to 10 weight-%, and a still more preferred amount is 5 to 10 weight-% of 1,2-propylene oxide based on the weight of alkoxylated started.

The alkoxylated starter is characterized in having one or more aliphatic hydroxyl groups. It may have, for example, 2, 3, 4, 5, 6 or more aliphatic hydroxyl groups, but preferred alkoxylated starters have 2 or 3 such groups. The alkoxylated starter is produced by polymerizing one or more alkylene oxides onto an initiator compound. The alkylene oxide(s) used to make the alkoxylated starter preferably are propylene oxide by itself or a mixture of 50 wt.-% of more of propylene oxide and correspondingly up to 50 weight-% of ethylene oxide. The alkoxylated starter has a hydroxyl equivalent weight at least 50% of that of the product of the process of the invention, and may have a hydroxyl equivalent weight up to 100% of that of such product. A preferred alkoxylated starter is a homopolymer of propylene oxide having a hydroxyl equivalent weight of 50 to 100%, more preferably 65 to 100%, of that of the product. An especially preferred alkoxylated starter is a homopolymer of propylene oxide having 2 or 3 hydroxyl groups and a hydroxyl equivalent weight of weight of 150 to 250. All molecular weights and equivalent weights described herein are number average molecular weights unless otherwise indicated.

The catalyst activation step is performed by subjecting a mixture containing the DMC catalyst, the alkoxylated starter and 1,2-propylene oxide to polymerization conditions until such time as polymerization begins. Typically, there is some period of inactivity during which little or no polymerization is seen. This is followed by the start of rapid polymerization and consumption of the propylene oxide. The consumption of the propylene oxide often is evidenced by a drop in reactor pressure.

Following activation of the catalyst, an alkylene oxide and low molecular weight starter are fed to the activated catalyst under reaction conditions.

The alkylene oxide contains at least 50%, preferably at least 75% and more preferably at least 90%, 1,2-propylene oxide, and may contain 100% propylene oxide by weight. Other alkylene oxides may be present, such as ethylene oxide, 1,2-butylene oxide, 2,3-butylene oxide, tetramethylene oxide, and the like. Among the other alkylene oxides, ethylene oxide if preferred, if any other alkylene oxide is present at all. Ethylene oxide may constitute up to 50%, up to 25% or up to 10% of the alkylene oxide, by weight. Ethylene oxide and 1,2-propylene oxide together may constitute 98 to 100 weight-% of the alkylene oxide. The composition of the alkylene oxide can be held constant during the feed, or may vary if desired. In some embodiments, for example, the proportion of ethylene oxide may be increased at the end of the feed, to increase the proportion of primary hydroxyl groups of the product.

The low equivalent weight starter is one or more compounds that has at least two, preferably 2 to 4, hydroxyl groups per molecule and a hydroxyl equivalent weight less than 50% of that of the product. The hydroxyl equivalent weight of the low molecular weight starter may be, for example, about 9 to 500, preferably 9 to 125 and more preferably 9 to 75. The starter may be, for example, one or more of water, ethylene glycol, diethylene glycol, triethylene glycol, propylene glycol, dipropylene glycol, tripropylene glycol, 1,4-butane diol, 1,6-hexane diol, glycerine, trimethylolpropane, trimethylolethane, pentaerythritol, erythritol, and the like. The starter may be a propoxylate and/or ethoxylate of any of the starters mentioned in the preceding sentence. Especially preferred starters are dipropylene glycol, diethylene glycol, glycerine and/or trimethylolpropane.

The polymerization conditions include an elevated temperature. The polymerization temperature is typically at least 80° C. and up to about 180° C. A preferred temperature is 120 to 160° C. The polymerization reaction usually is performed at superatmospheric pressure, but can be performed at atmospheric pressure or even subatmospheric pressures.

The total amounts of alkylene oxide and low molecular weight starter that are fed define the "build ratio" of the process, i.e., the ratio of the hydroxyl equivalent weight of the product divided by the hydroxyl equivalent weight of the low molecular weight starter. The build ratio can be expressed as $1+\text{Wt}_{oxide}/\text{Wt}_{starter}$, where $\text{Wt}_{oxide}$ is the weight of the alkylene oxide fed to the reaction and $\text{Wt}_{starter}$ is the weight of the starter fed to the reaction. Therefore, the total amounts of alkylene oxide and low molecular weight starter that are fed are chosen together to obtain the desired build ratio and therefore the desired hydroxyl equivalent weight of the product. The build ratio may be as small as about 2 and as large as 500. In some embodiments, the build ratio is 5 to 10, to produce a polyether polyol product having a hydroxyl equivalent weight of, for example, 300 to 1000. In other embodiments, the build ratio is 10:1 to 100:1, to produce a polyether polyol product having a hydroxyl equivalent weight of, for example, 1050 to 6000.

The absolute rates at which the alkylene oxide and starter are fed are in the most general sense selected so that control of reaction temperatures and pressures is maintained within the operational limits of the equipment. It is generally preferable control the feed rate of the alkylene oxide such that the level of unreacted oxides in the reaction vessel is maintained during the alkylene oxide fed to a reasonable level, such as up to 10% by weight, preferably from 1 to 6% by weight, more preferably 1 to 4% by weight and still more preferably 1 to 2% by weight. The alkylene oxide may be fed on demand during this step, by introducing the oxide mixture as it is consumed, to maintain a constant reactor pressure during this step.

The alkylene oxide may be fed, for example, over a period of 30 minutes to 5 hours. In some specific embodiments, the alkylene oxide is fed over a period of 1 to 4 hours, or a period of 1.5 to 4 hours.

The low equivalent weight starter is added over a shorter period, such that all of the low equivalent weight starter is added by the time 80 to 95% by weight of the alkylene oxide has been added. It is preferred to add all of the low equivalent weight starter by the time 80 to 92%, more preferably 81 to 90%, of the alkylene oxide has been fed. The average relative rates of addition of low equivalent weight starter and alkylene oxide, during the period of time the low equivalent weight starter, can be expressed as $$\frac{rate_o}{0.95(B_r - 1)} \leq rate_s \leq \frac{rate_o}{0.8(B_r - 1)} \quad (I)$$

where $rate_o$ is the average rate of alkylene oxide addition in weight per unit time; $B_r$ is the build ratio and $rate_s$ is the average rate of starter addition in weight per unit time. $B_r-1$ is the total weight of the alkylene oxide feed divided by the total weight of the starter feed. In some embodiments, the instantaneous rates of addition of starter and alkylene oxide during the addition of the low equivalent weight starter is such that $rate_s$ is maintained within the range defined by foregoing equation I.

The feed rates of the alkylene oxide and the low equivalent weight starter each may be constant during the respective times they are fed, or each may vary. If the feed rates vary during the time the low equivalent weight starter is being fed, it is again preferred to maintain instantaneous relative rates of addition as defined in equation 1.

During the time the alkylene oxide and low equivalent weight starter both are being fed, they can be fed individually or as a pre-formed mixture. Using a pre-formed mixture allows one to easily maintain a constant ratio of alkylene oxide to starter during the time the starter is fed, particularly in cases in which the alkylene oxide addition rate is not constant, such as may be the case when the alkylene oxide is fed on demand.

After 80 to 95% of the alkylene oxide has been fed, the feed of low equivalent weight starter is discontinued, and the remaining alkylene oxide is thereafter fed to the reaction under polymerization conditions. The feed rate during this step preferably is such that the unreacted oxide content remains in the ranges mentioned above, until the alkylene oxide feed is completed.

After the alkylene oxide feed is completed, the reaction mixture can be digested to complete the reaction of the alkylene oxides. No further addition of alkylene oxides is performed during or after the digestion step. The digestion includes continued exposure of the reaction mixture to polymerization conditions in the presence of the DMC catalyst complex to polymerize most or all of the remaining alkylene oxides. The amount of unreacted alkylene oxides may be reduced in this step to, for example, less than 2%, less than 1% or less than 0.5% by weight.

The resulting product may be worked up if desired by separating unreacted oxides and impurities. The catalyst residues may be removed from the product if desired, although it is preferred to leave them with the product.

The polyether polyol produced in the foregoing process has a hydroxyl equivalent weight of 300 to 6000. In specific embodiments, the hydroxyl equivalent weight is 300 to 1000, 500 to 6000, 500 to 2000, or 1000 to 1800. The polyether polyol has a nominal hydroxyl functionality (number of hydroxyl groups per molecule) equal to the average number of hydroxyl groups per molecule of starter compound(s). As is well known, the actual functionality of a polyether polyol (i.e., the actual average number of hydroxyl groups per molecule) is lower than the nominal functionality due to certain side reactions that occur during the polymerization process. When propylene oxide is polymerized, the predominant side reaction that affects functionality is an isomerization of propylene oxide to propenyl alcohol or allyl alcohol. The propenyl alcohol or allyl alcohol then functions as a monofunctional initiator onto which propylene oxide and ethylene oxide can polymerize to form monofunctional species whose presence reduces the average functionality of the product. Because these monofunctional species have a terminal propenyl or allyl group, which is unsaturated, the amount of unsaturated species in the product can be measured as an indication of the amount of monofunctional species. The random copolymer of the invention has no more than 0.01 milliequivalents of unsaturation per gram of copolymer. The amount of terminal unsaturation may be no greater than 0.007 meq/g or no greater than 0.004 meq/g.

A polyether polyol made in accordance with the invention has at most a small amount of low molecular weight material and a small amount of high molecular weight material. The polyether polyol in some embodiments contains less than 5 weight-%, less than 2 weight-% or less than 1 weight-% of molecules having molecular weights 65% or less of the peak molecular weight, by gel permeation chromatography (GPC). The peak molecular weight is the maximum of the GPC molecular weight curve. In some embodiments, the polyether polyol in addition contains less than 5 weight-%, less than 2 weight-% or less than 1 weight-% of molecules having molecular weights 140% or more than the peak molecular weight by GPC.

The polyether polyol is useful as a starting material for making polyurethanes. Methods for manufacturing polyurethanes from polyether polyols are well known in the art. Polyurethanes are prepared by reacting the polyether polyol, by itself or together with other isocyanate-reactive compounds, with one or more polyisocyanate compounds. A polyether polyol made in accordance with this invention is useful for preparing a wide variety of polyurethane products including, flexible polyurethane foam, microcellular polyurethane elastomers, non-cellular polyurethane elastomers, rigid polyurethane foams and structural polyurethanes. The hydroxyl equivalent weight and functionality of the polyether polyol is selected in each case in accordance with the requirements of the particular application.

The polyether polyol of the invention exhibits good ability to compatibilize water with certain physical blowing agents, in particular hydrocarbon blowing agents such as cyclopentane. This is unlike polyether polyols made in previous DMC-catalyzed processes made with continuous addition of starter, which poorly compatibilize water and physical blowing agents. In this respect, the polyether polyol of the invention performs similarly to those made using potassium hydroxide catalysts.

Therefore, the invention is also a formulated polyol composition that includes a polyether polyol made in the process of the invention, water and 5 to 40% by weight, based on the weight of the formulated polyol composition, of at least one physical blowing agent.

In the formulated polyol composition:
a) the polyether polyol of the invention may constitute at least 5%, at least 10% or at least 20% of the total weight of the formulated polyol composition, and up to 94.5%, up to 80%, up to 50% or up to 25% of the total weight thereof;
b) water may constitute 0.5 to 6%, preferably 1 to 5% and more preferably 1.5 to 4% of the total weight of the formulated polyol composition;
c) the physical blowing agent may be, for example, a chlorocarbon, a fluorochlorocarbon or a hydrofluorocarbon having up to 6 carbon atoms, or a hydrocarbon having 3 to 8, preferably 4 to 6 carbon atoms. A preferred physical blowing agent includes or is constituted by cyclopentane;
d) the formulated polyol composition may contain one or more other additional isocyanate-reactive compounds in addition to the polyether polyol of the invention. If present, these may constitute, for example, 1 to 89%, 10 to 89%, 25 to 85% or 50 to 85% of the total weight of the formulated polyol composition.

The additional isocyanate-reactive compounds are materials having one or more, preferably 2 or more, isocyanate-reactive groups per molecule. These isocyanate reactive groups may be, for example, hydroxyl, primary or secondary amino, thiol or other groups that have an active hydrogen according to the well-known Zerewitnoff test. The additional isocyanate-reactive compounds may include one or more of
a) a polyether polyol, different than that produced in accordance with the invention, which nominally has 2 to 8 hydroxyl groups per molecule and a hydroxyl equivalent weight of 151 to 6000;
b) a polyester polyol having 2 to 4 hydroxyl groups per molecule and a hydroxyl equivalent weight of 151 to 6000;
c) a crosslinker, by which it is meant one or more compounds having at least three hydroxyl groups, primary amino and/or secondary amino group, and an equivalent weight per of up to 150, preferably up to 100 and more preferably up to 75 per combined number of hydroxyl, primary amino and secondary amino hydrogens. The equivalent weight of the crosslinker is the number average molecular weight divided by the total number of hydroxyl groups and amine hydrogen atoms. Examples of crosslinkers include trimethylolpropane, trimethylolethane, glycerine, erythritol, pentaerythritol, triethanolamine, diethanolamine, other aminoalcohols having an equivalent weight of up 150, diethylene triamine, triethylene pentamine, and the like.
d) a chain extender, by which it is meant one or more compounds having exactly two hydroxyl groups and/or primary or secondary amine groups, and an equivalent weight per of up to 150, preferably up to 100 and more preferably up to 75. The equivalent weight of the chain extender is the molecular weight divided by the total number of hydroxyl groups and amine hydrogen atoms. Examples of chain extenders include ethylene glycol, 1,2-propane diol, 1,3-propane diol, 1,4-butanediol, diethylene glycol, triethylene glycol, dipropylene glycol, tripropylene glycol, ethylene diamine, diethyltoluene diamine, isophorone diamine, cyclohexanedimethanol, di(aminomethyl)cyclohexane, and the like.

In a formulated polyol composition useful for making rigid polyurethane foam, the polyether polyol of the invention may have a hydroxyl equivalent weight of 350 to 1200, especially 350 to 750, and a nominal hydroxyl functionality of 2 to 4, preferably 2 or 3. A specific polyether polyol of the invention has a nominal functionality of 2 and a hydroxyl equivalent weight of 350 to 750. In such a formulated polyol composition, the polyether polyol of the invention may constitute 5 to 25% of the total weight of the formulated polyol composition. Such a formulated polyol composition in addition preferably contains 50 to 85% by weight of one or more additional isocyanate-reactive compounds. At least one such additional isocyanate-reactive material has a hydroxyl equivalent weight of 30 to 200 and a nominal hydroxyl functionality of at least 3. The physical blowing agent preferably is a hydrocarbon and more preferably contains or is constituted by cyclopentane.

A formulated polyol composition containing the polyether polyol of the invention may further include one or more catalysts and surfactants as described below.

Polyurethanes are produced by reacting the polyether polyol with an organic polyisocyanate. The polyisocyanate contains at least 2 isocyanate groups per molecule. It preferably contains up to 4 isocyanate groups per molecule. The polyisocyanate compound(s) may have, for example, an average of 2 to 4 or 2.3 to 3.5 isocyanate groups per molecule. The polyisocyanate preferably has an isocyanate equivalent weight of 80 to 250, more preferably 80 to 200 and still more preferably 80 to 150. The isocyanate groups may be aliphatic, cycloaliphatic or aromatic, but in general aromatic polyisocyanates are preferred.

Among the useful aromatic polyisocyanate compounds are m-phenylene diisocyanate, toluene-2,4-diisocyanate, toluene-2,6-diisocyanate, naphthylene-1,5-diisocyanate, methoxyphenyl-2,4-diisocyanate, diphenylmethane-4,4'-diisocyanate, diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, polymethylene polyphenylisocyanate (PMDI), toluene-2,4,6-triisocyanate and 4,4'-dimethyldiphenylmethane-2,2',5,5'-tetraisocyanate. Modified aromatic polyisocyanates that contain urethane, urea, biuret, carbodiimide, uretoneimine, allophonate or other groups formed by reaction of an isocyanate groups are also useful. A preferred aromatic polyisocyanate is MDI or PMDI (or a mixture thereof that is commonly referred to as "polymeric MDI", and so-called "liquid MDI" products that are mixtures of MDI and MDI derivatives that have biuret, carbodiimide, uretoneimine and/or allophonate linkages. Another preferred aromatic polyisocyanate is toluene diisocyanate (TDI), in particular a mixture of 60 to 90% of the 2,4-isomer and 10 to 40% of the 2,6-isomer.

Examples of aliphatic and cycloaliphatic polyisocyanates include cyclohexane diisocyanate, 1,3- and/or 1,4-bis(isocyanatomethyl)cyclohexane, 1-methyl-cyclohexane-2,4-diisocyanate, 1-methyl-cyclohexane-2,6-diisocyanate, methylene dicyclohexane diisocyanate, isophorone diisocyanate and hexamethylene diisocyanate.

The amount of polyisocyanate may be is selected to provide an isocyanate index of 60 to 500, more preferably 70 to 250 and even more preferably 70 to 150. Isocyanate index is 100 times the ratio of isocyanate groups to isocyanate-reactive groups provided by the polyurethane-forming reactants. Water and a primary amine group each are considered as having two isocyanate-reactive groups for purposes of calculating isocyanate index.

The polyurethane-forming reaction is generally performed in the presence of at least one catalyst for the reaction of an alcohol with an isocyanate group. Suitable catalysts include, for example, include tertiary amines, cyclic amidines, tertiary phosphines, various metal chelates, acid metal salts, strong bases, various metal alcoholates and phenolates and metal salts of organic acids. Most catalysts for the alcohol-isocyanate reaction also catalyze the reaction between water and the isocyanate groups to a greater or lesser extent. It is preferred to use one or more catalysts that effectively catalyzes both the alcohol-isocyanate and water-isocyanate reactions, or at least one catalyst that is effective for the alcohol-isocyanate reaction and at least one other catalyst that is effective for the water-isocyanate reaction.

The catalyst may be or include one or more tin catalysts such as stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl and n is 0 to 18, and the like. Other useful tin catalysts include dialkyl tin mercaptides such as dioctyltinmercaptide, dibutyltinmercaptide and dibutyltin mercaptide.

Examples of other metal-containing catalysts are bismuth, cobalt and zinc salts.

Examples of tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether (DMEE), triethylenediamine and dimethylalkylamines where the alkyl group contains from 4 to 18 carbon atoms. Useful amidine catalysts include 1,8-diazabicyclo[5.4.0]-undec-7-ene. The amine catalyst may be a non-emissive type that contains one or more isocyanate-reactive amino or hydroxyl groups, such as those sold by Air Products under the trade designations Dabco™ RP202, Dabco™ NE1070, Dabco™NE1909, and the like.

If a foamed polyurethane is to be made, it is generally preferred to conduct the polyurethane-forming reaction in the presence of a foam-stabilizing surfactant. The foam-stabilizing surfactant helps stabilize the gas bubbles produced during the foaming process until the polymer has cured. A wide variety of silicone surfactants as are commonly used in making polyurethane foams can be used in making the foams with the polymer polyols or dispersions of this invention. Examples of such silicone surfactants are commercially available under the tradenames Tegostab™ (Th. Goldschmidt and Co.), Niax™ (GE OSi Silicones) and Dabco™ (Air Products and Chemicals).

In addition to the foregoing ingredients, the polyurethane-forming reaction may be performed in the presence of one or more optional ingredients such as colorants, biocides, antioxidants, preservatives, filler particles, reinforcing fibers and the like. Any or all of these may be absent from the reaction mixture.

The reaction of the polyurethane-forming reactants is in general carried out by simply mixing the starting materials and allowing them to react. The reaction in most cases proceeds spontaneously even at room temperature, and in some embodiments the mixing of the isocyanate-reactive ingredients with the polyisocyanates is performed with the various ingredients at approximately room temperature, such as from 15 to 35° C., and the resulting reaction mixture is then allowed to react without additional heating. Alternatively, one or more of the various ingredients can be preheated to a temperature of, for example 35 to 80° C. before being combined with the other ingredients to produce the foam. In other embodiments, the reaction mixture is heated to a temperature of, for example, 35 to 80° C., after it is formed to help drive the cure. In still other embodiments, the reaction mixture is introduced into mold that is preheated to a temperature of 35 to 80° C. and allowed to cure in the mold without further application of heat.

Foam can be prepared in a free-rise (slabstock) process or a molding process. In a free-rise process, the reaction mixture is introduced into an open container and allowed to expand in at least the vertical direction under no restraint or only minimal restraint (such as the weight of a polymeric film). In an industrial slabstock foam process, the reaction mixture is formed continuously by bringing the various ingredients individually or in two or more subcombinations to a mixing head, where they are continuously mixed and dispensed into a trough in which the reaction mixture expands and cures.

In a flexible foam molding process, the various ingredients or various subcombinations thereof are mixed and introduced into a mold, and cured in the closed mold. The amount of reaction mixture introduced into the mold is such that upon expansion and curing, the mold is filled and the density of the foam produced is 24 to 60 kg/m³. The mold may be preheated to avoid heat sink effects. In a so-called "cold-molding" process, the mold is optionally preheated to 35 to 80° C., preferably 40 to 60° C., and curing takes place in the mold without further heating of the mold. In a hot-molding process, the mold may or may not be preheated, and after the reaction mixture is introduced, the mold is externally heated (such as in an oven) to 35" to 80° C., preferably 50 to 80° C. until the reaction mixture cures at least enough to form a stable foam that can be demolded without permanent damage.

Rigid polyurethane foam can be made in a slabstock or molding method as described before. To form thermal insulation in appliances such as refrigerators, freezers, coolers and other devices, internal and external walls are positioned such that cavity to be filled is formed between the walls, and the foam formulation is dispensed into the cavity where it rises and cures to form a foam insulation layer.

The following examples are provided to illustrate the invention but are not intended to limit the scope thereof. All parts and percentages are by weight unless otherwise indicated.

In the following examples:

Examples 1-2 and Comparative Samples A and B

Examples 1 and 2 and Comparative Samples A and B are prepared in a single run. A 10-L reactor is charged with a 360 equivalent weight propoxylated dipropylene glycol and enough of a zinc hexacyanocobaltate catalyst complex to provide 30 ppm of catalyst based on the final weight of product. The reactor is heated to 130° C., agitated and sparged at 30 mbar (3 KPa) actual pressure with nitrogen. 1,2-propylene oxide (PO) (about 2 weight-%, based on the weight of the 360 equivalent weight propoxylated dipropylene glycol) is fed to the reactor. The reactor pressure is monitored and when the pressure drops, 270 g of propylene oxide are fed within 10 minutes to ensure the catalyst has become activated. Afterwards, propylene oxide (3377 g) and propylene glycol (123 g) are linearly fed to the reactor in a 96.4/3.6 by weight ratio over a period of 130 minutes. The level of unreacted oxide in the reactor during this and subsequent additions is maintained at 1-2% by weight. A sample of the reactor contents is collected as soon as the cofeed of propylene oxide and propylene glycol is completed. This sample is designated Comparative Sample A. The molecular weight distribution of this sample is represented as line A in the FIGURE. The propylene oxide feed is continued without further co-addition of propylene glycol, again maintaining the unreacted oxide level at 1-2% by weight. Samples are collected from the reactor after 400 g (Ex. 1) and 800 g (Ex. 2) of propylene oxide has been added. A final sample (Comparative Sample B) is collected after 1200 g propylene oxide are fed and the reactor contents subsequently digested for 20-30 minutes to consume residual monomers. The molecular weight distributions of Examples 1 and 2 and Comparative Sample B are shown as lines 1, 2 and B, respectively, in the FIGURE.

In Comparative Sample A, 100% of the propylene oxide feed (except the small amount used to activate the catalyst) is co-fed with the starter. As can be seen in the FIGURE, this produces a product in which high molecular weight material is essentially eliminated, but a significant amount of low molecular weight material (i.e., the fraction to the left of the vertical line that indicates a molecular weight of 65% of the peak molecular weight) is produced.

In Example 1, 89% of the propylene oxide is fed during the propylene oxide/propylene glycol co-feed, and 1 i % of the propylene oxide is fed after the propylene glycol co-feed is discontinued. The amount of each of the low molecular weight and high molecular weight material is very small. In Example 2, 81% of the propylene oxide is fed during the propylene oxide/propylene glycol co-feed, and 19% of the propylene oxide is fed after the propylene glycol co-feed is discontinued. Again, only small amounts of high and low molecular weight material are formed.

In Comparative Sample B, only 74% of the propylene oxide is fed before the propylene glycol co-feed is discontinued. This sample has a pronounced high molecular weight fraction (i.e., the fraction to the right of the vertical line that indicates a molecular weight of 140% of the peak molecular weight).

What is claimed is:

1. A process for making a polyether polyol product, comprising:
    a) activating a DMC catalyst complex in the presence of
        i) an alkoxylated starter having a hydroxyl equivalent weight of 50 to 100% of the hydroxyl equivalent weight of the polyether polyol product and ii) up to 10 weight-%, based on the weight of the alkoxylated starter, of 1,2-propylene oxide;
    b) continuously feeding an alkylene oxide containing at least 50 weight-% 1,2-propylene oxide to the activated DMC catalyst under polymerization conditions,
    wherein starting at the beginning of step b), a low equivalent weight starter is fed continuously to the activated DMC catalyst under polymerization conditions, the feed of low molecular weight starter is continued until 80 to 95% of the alkylene oxide feed in step b) has been completed and the feed of low molecular weight starter is then discontinued while continuing the alkylene oxide feed, wherein the total weight of low molecular weight starter added in step b) is 0.2 to 25% of the total weight of alkylene oxide added in step b).

2. The process of claim 1 wherein in step b), the feed of low molecular weight starter is continued until 81 to 90% of the alkylene oxide feed in step b) has been completed.

3. The process of claim 1 wherein in step b), the low molecular weight starter and alkylene oxide are fed at a constant ratio until the feed of low molecular weight starter is discontinued.

4. The process of claim 1, wherein the alkylene oxide is 1,2-propylene oxide.

5. The process of claim 1, wherein the low molecular weight starter is propylene glycol.

6. The process of claim 1, wherein the polyether polyol product has a hydroxyl equivalent weight of 350 to 750 and a nominal functionality of 2 to 4.

7. A polyether polyol comprising the reaction product of
    a) an activated DMC catalyst complex in the presence of
        i) an alkoxylated starter having a hydroxyl equivalent weight of 50 to 100% of the hydroxyl equivalent weight of the polyether polyol product and ii) up to 10 weight %, based on the weight of the alkoxylated starter, of 1,2-propylene oxide;
    with
    b) an alkylene oxide comprising at least 50 weight % of 1,2-propylene oxide, with said alkylene oxide being continuously fed to said activated DMC catalyst complex under polymerization conditions;
    and
    c) a low molecular weight starter which is continuously fed to said activated DMC catalyst under polymerization conditions at the beginning of feeding said alkylene oxide b);
    wherein the feed of said low molecular weight starter is continued until 80 to 95% of the feed of said alkylene oxide b) is completed and the feed of low molecular weight starter is then discontinued while continuing the feed of said alkylene oxide b), wherein the total weight of low molecular weight starter added during the feed of said alkylene oxide is 0.2 to 25% of the total weight of the feed of said alkylene oxide b).

8. A polyether polyol containing double metal catalyst residues, having a number average hydroxyl equivalent weight of 500 to 2000, and a molecular weight distribution, as determined by gel permeation chromatography, with a peak molecular weight wherein less than 1 weight percent of molecules have a molecular weight of 140% or more than the peak molecular weight, and less than 1 weight percent of molecules have a molecular weight of 65% or less of the peak molecular weight.

9. A formulated polyol composition comprising the polyether polyol of claim 7, water, and 5 to 40% by weight, based on the weight of the formulated polyol composition, of at least one physical blowing agent.

10. The formulated polyol composition of claim 9 which comprises 5 to 50% of said polyether polyol, based on the total weight of the formulated polyol composition, 1.5 to 4% of water, based on the total weight of the formulated polyol composition, and said physical blowing agent comprises cyclopentane.

11. The polyether polyol of claim 7, wherein the feed of said low molecular weight starter is continued until 80 to 92% of the feed of said alkylene oxide b) is completed and the feed of low molecular weight starter is then discontinued while continuing the feed of said alkylene oxide b).

12. The polyether polyol of claim 7, wherein the feed of said low molecular weight starter is continued until 81 to 90% of the feed of said alkylene oxide b) is completed and the feed of low molecular weight starter is then discontinued while continuing the feed of said alkylene oxide b).

13. A formulated polyol composition comprising the polyether polyol of claim 8, water, and 5 to 40% by weight, based on the weight of the formulated polyol composition, of at least one physical blowing agent.

14. The formulated polyol composition of claim 13 which comprises 5 to 50% of said polyether polyol, based on the total weight of the formulated polyol composition, 1.5 to 4% of water, based on the total weight of the formulated polyol composition, and said physical blowing agent comprises cyclopentane.

* * * * *